United States Patent
Aoshima et al.

(10) Patent No.: US 7,452,154 B2
(45) Date of Patent: Nov. 18, 2008

(54) UNIVERSAL JOINT COMPONENT AND AUTOMOTIVE LAMP UNIT

(75) Inventors: Tomoaki Aoshima, Hamamatsu (JP); Nobuhiro Hara, Hamamatsu (JP); Takeyuki Tachiiwa, Shizuoka (JP)

(73) Assignees: NIFCO Inc., Yokohama (JP); Koito Manufacturing Co., Ltd., Tokyo (JP)

( * ) Notice: Subject to any disclaimer, the term of this patent is extended or adjusted under 35 U.S.C. 154(b) by 523 days.

(21) Appl. No.: 11/061,774

(22) Filed: Feb. 22, 2005

(65) Prior Publication Data
US 2005/0191119 A1  Sep. 1, 2005

(30) Foreign Application Priority Data
Feb. 26, 2004  (JP) ............................. 2004-051552

(51) Int. Cl.
*F16C 11/00* (2006.01)
(52) U.S. Cl. .................. 403/122; 403/123; 403/124; 403/125; 403/131; 403/144; 362/515; 362/524; 362/514
(58) Field of Classification Search .................. 362/515, 362/524, 514; 403/122–144, 329
See application file for complete search history.

(56) References Cited
U.S. PATENT DOCUMENTS

| | | | |
|---|---|---|---|
| 3,989,321 A * | 11/1976 | McCloskey | 384/211 |
| 4,318,208 A | 3/1982 | Borja et al. | |
| 4,666,596 A | 5/1987 | Oelbermann et al. | |
| 6,113,301 A | 9/2000 | Burton | |
| 6,247,860 B1 * | 6/2001 | Yanagisawa | 400/615.2 |
| 2002/0192016 A1 * | 12/2002 | Monninghoff et al. | 403/122 |
| 2003/0112636 A1 * | 6/2003 | Tomita et al. | 362/515 |

FOREIGN PATENT DOCUMENTS

| | | |
|---|---|---|
| GB | 2 082 668 | 3/1982 |
| JP | 62-15535 | 1/1987 |

* cited by examiner

*Primary Examiner*—Stephen F Husar
*Assistant Examiner*—Jessica L McMillan
(74) *Attorney, Agent, or Firm*—Manabu Kanesaka (57) ABSTRACT

A universal joint component is used for connecting two members, such as a reflector and a lamp body. The universal joint component includes a shaft, an installation section formed on one end of the shaft, and a spherical head formed on the other end of the shaft. The spherical head includes a joint base, a top end, and at least one gap formed on a side of the spherical head between the top end and the joining base. The gap is formed of a groove or through hole so as to straddle a phantom line substantially passing through a center of the spherical head and perpendicularly intersecting a shaft axis of the shaft. Split head sections are defined by the at least one gap so that the split head sections flexibly deform when the spherical head is inserted into a spherical socket.

10 Claims, 14 Drawing Sheets

UNIVERSAL JOINT COMPONENT AND AUTOMOTIVE LAMP UNIT

BACKGROUND OF THE INVENTION AND RELATED ART STATEMENT

The present invention relates to a universal joint component which is fitted into a spherical socket for use in coupling a member furnished with the spherical socket so as to move universally, and an improved automotive lamp unit including the universal joint component.

There is a ball joint in which its ball seat is provided with a groove that extends from an opening of a spherical cavity forming the ball seat to its back from the perspective of allowing the ball seat (spherical socket) forming the ball joint to receive and hold the ball with ease (see patent reference 1). In this type of ball joint, however, if a flexible deforming property is given to the ball, such a special feature added to the spherical socket would be unnecessary.

There is also a ball joint in which the ball that is to be fitted into the ball seat is simply divided into three sections, and each section is allowed to flexibly deform its shape (see patent reference 2). In this case, however, the easier fitting of the ball into the socket inevitably gives rise to the inconvenience of easily allowing the ball to slip out of the ball seat.

Patent reference 1: Japanese Utility Model Publication (KOKOKU) No. 62-15535

Patent reference 2: Japanese Utility Model Publication (KOKAI) No. 06-58504

An object of the present invention is to provide a universal joint component with an appropriate flexible deforming property having a spherical head to be fitted into a spherical socket, namely, a spherical head, so that the spherical head is easily and properly fitted into the spherical socket without providing any feature to the spherical socket.

Another object of the present invention is to provide an automotive lamp unit with a reflector which is so furnished that its tilt is adjustable to allow the lamp body to stably hold the reflector even when vibration during travel or the like is applied.

SUMMARY OF THE INVENTION

To solve the problems described above, the universal joint component of the present invention is provided with the following features (1)-(3):

(1) A universal joint component having a plastic shaft furnished with a spherical head on one end and an installation section on the other end for coupling a member installed at an installation section of the shaft with a member having a spherical socket formed therein so as to move universally by fitting the spherical head into the spherical socket, (2) one or more gaps composed of grooves or through holes formed so as to straddle a phantom line that substantially passes through the center of the spherical head and perpendicularly intersects with the shaft axis of the shaft are formed on the side of the spherical head between the top end and the joining base, which joins the spherical head with the shaft, (3) split head sections sectioned by the gaps thereby flexibly deforming when the spherical head is inserted into the spherical socket through the socket opening that has a slightly smaller diameter than the diameter of the spherical head.

According to such a construction, the spherical head is inserted into the spherical socket through the socket opening by flexibly deforming the sides of the spherical head with a single motion, and the spherical socket is allowed to bear the inserted spherical head so as to move universally. In other words, during the insertion, the split head sections are flexibly deformed once so that the largest section of the spherical head, namely, the location at the phantom line that passes substantially through the center of the spherical head and perpendicularly intersects with the shaft axis of the shaft, is inserted through the socket opening. In addition, the split head sections are subsequently allowed to regain their original forms so as not to allow the spherical head to slip out of the socket opening. The distance between the upper ends of the gaps positioned near the top end of the aforementioned spherical head and the phantom line may be made larger than the distance between the lower ends of the gaps positioned near the joining base of the spherical head and the phantom line.

When constructed this way, the split head sections created by such gaps flexibly deform more easily near the top end of the spherical head, while, on the other hand, the flexible deformation is made difficult near the joining base. In other words, when inserting the spherical head into the spherical socket through the aforementioned socket opening, the sections of the split head sections positioned near the top end of the spherical head flexibly deform more easily to allow the spherical head to be inserted smoothly into the spherical socket. On the other hand, when force is applied to the spherical head, which is inserted into and coupled with the spherical socket, in the direction of slipping out of the spherical socket, such force is resisted because it is difficult for the locations of the split head sections near the joining base to flexibly deform. Accordingly, the coupled state between the spherical socket and the spherical head, i.e., the state wherein the two members are coupled via the universal joint component, is ensured with stability.

The universal joint component may have gaps that are comprised of grooves, and the split head sections may be formed so as to allow their upper ends and lower ends to join with the core, which is formed by the gaps created in the spherical head at two adjacent locations in different directions and communicatively connected with each other inside the spherical head, near the top end and the joining base of the spherical head, respectively, and gaps for deformation are formed with respect to the core between the upper ends- and lower ends.

In this case, a certain degree of rigidity can be given to the spherical head while providing the split head sections with the required flexible deforming property.

The sectional areas of the upper ends of the aforementioned split head sections may be made larger than the sectional areas of the lower ends of the split head sections.

In this case, the split head sections formed by the gaps can flexibly deform even more effectively near the top end of the spherical head. On the other hand, it is more difficult for them to flexibly deform near the joining base.

The joining base of the aforementioned spherical head may be provided with protrusions that are inserted into the spherical socket while being flexibly deformed slightly as the spherical head is inserted into the spherical socket.

In this case, when force is applied to the spherical head inserted into and coupled with the spherical socket in the direction of slipping out of the spherical socket, the protrusions abut against the rim of the socket opening from inside of the spherical socket to resist such force. Accordingly, the coupled state between the spherical socket and the spherical head, i.e., the state wherein the two members are coupled via the universal joint component, is ensured with a greater degree of stability.

Moreover, to solve the aforementioned problems, in the present invention, an automotive lamp unit is so formed that either a reflector or lamp body is installed at the installation section of the shaft in the aforementioned universal joint component, and the spherical head of the shaft is fitted into the spherical socket disposed on the other of the reflector or the lamp body.

In such an automotive lamp unit, first of all, the spherical head of the shaft in the universal joint component is fitted into the spherical socket disposed on either the reflector or the lamp body to thereby easily install the reflector to the lamp body so that its tilt is adjustable.

Second, the spherical head of the shaft in the universal joint component has the split head sections that flexibly deform by utilizing the gaps formed on the side of the spherical head. Thus, the spherical head is easily fitted into the spherical socket, but it is difficult for it to slip out. Moreover, even if vibration during travel or the like is applied, the reflector can be stably held by the lamp body.

According to the universal joint of the present invention, the spherical head can be fitted into the spherical socket easily and properly by appropriately flexibly deforming the spherical head of the universal joint component without adding any feature to the spherical socket.

Moreover, according to the automotive lamp unit of the present invention, the reflector can be stably held by the lamp body even when vibration during travel or the like is applied.

DETAILED DESCRIPTION OF PREFERRED EMBODIMENTS

In the following, the best mode of the present invention will be explained based on FIGS. 1 to 16.

Figure 1:
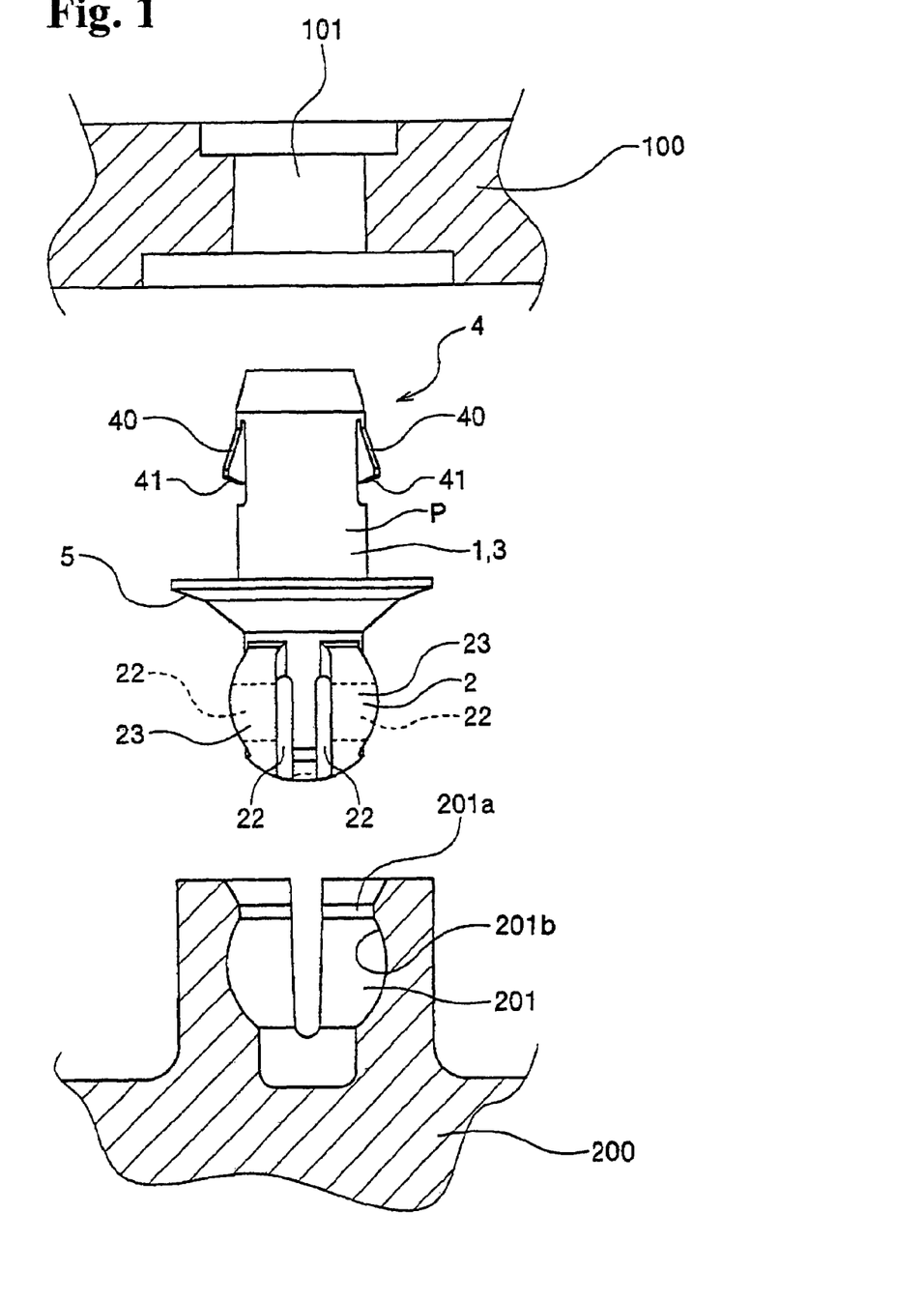
FIG. 1 is a side view separately illustrating universal joint component P, and two members 100 and 200 which are to be coupled via the component P.
Figure 2:
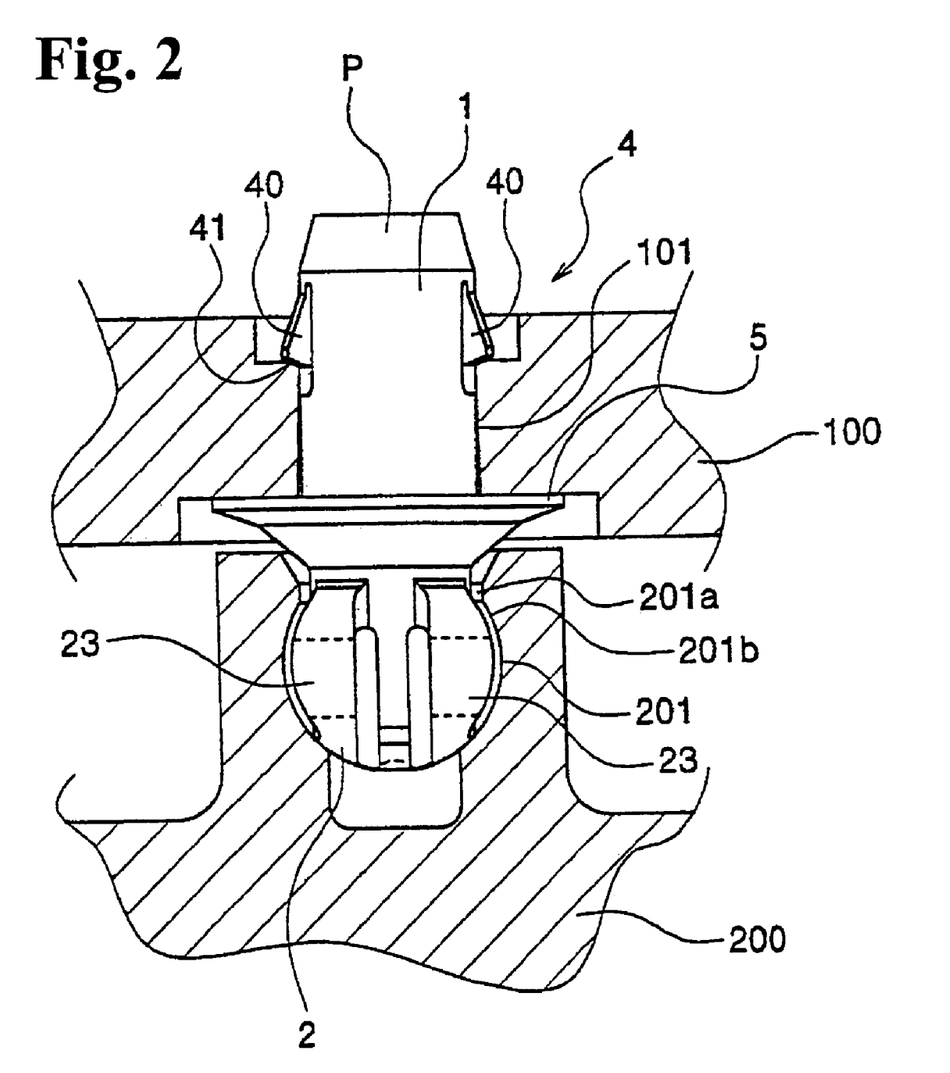
FIG. 2 is a side view illustrating the same component P in the condition in use.
Figure 3:
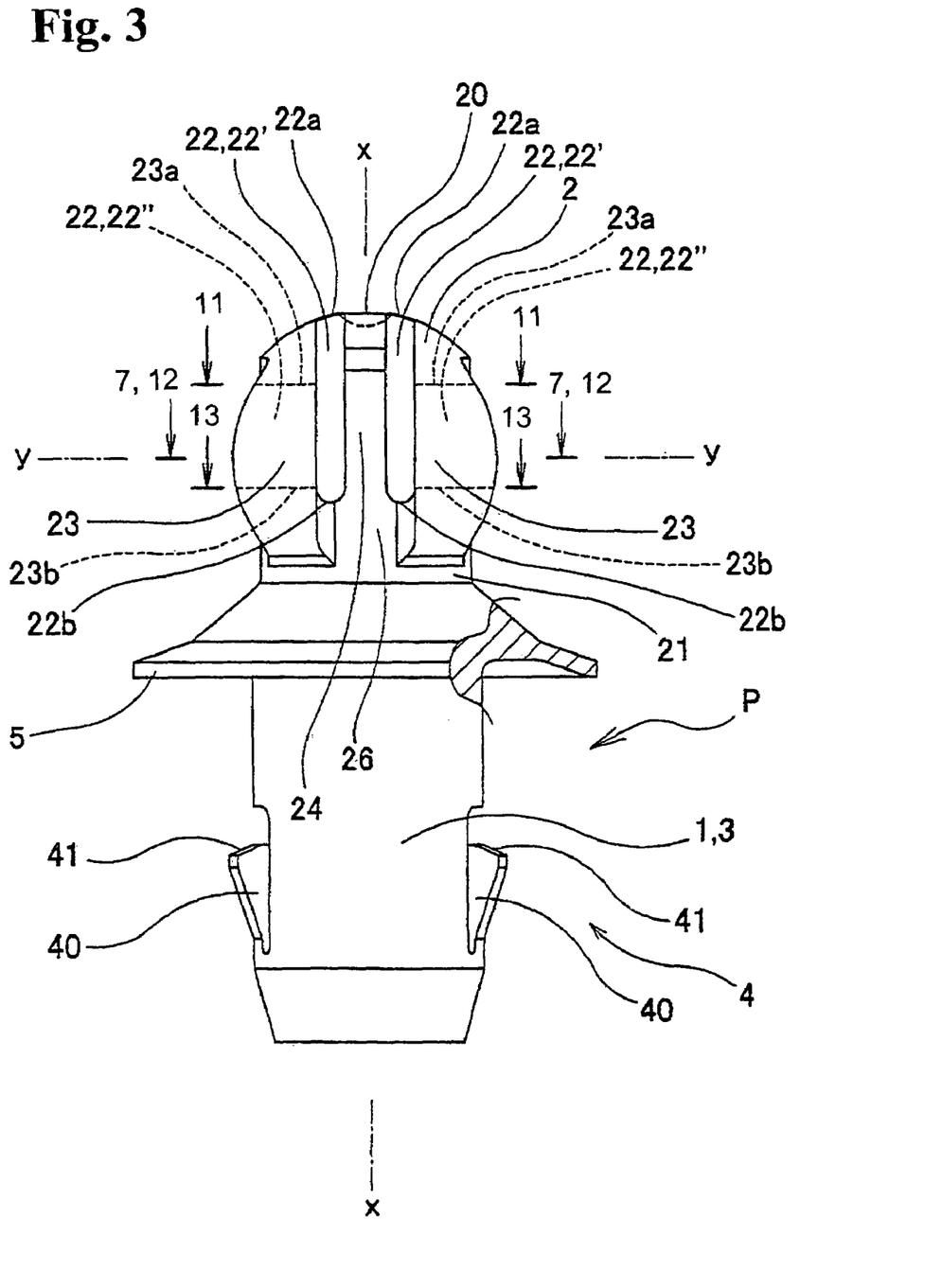
FIG. 3 is a front view of the same component P.
Figure 4:
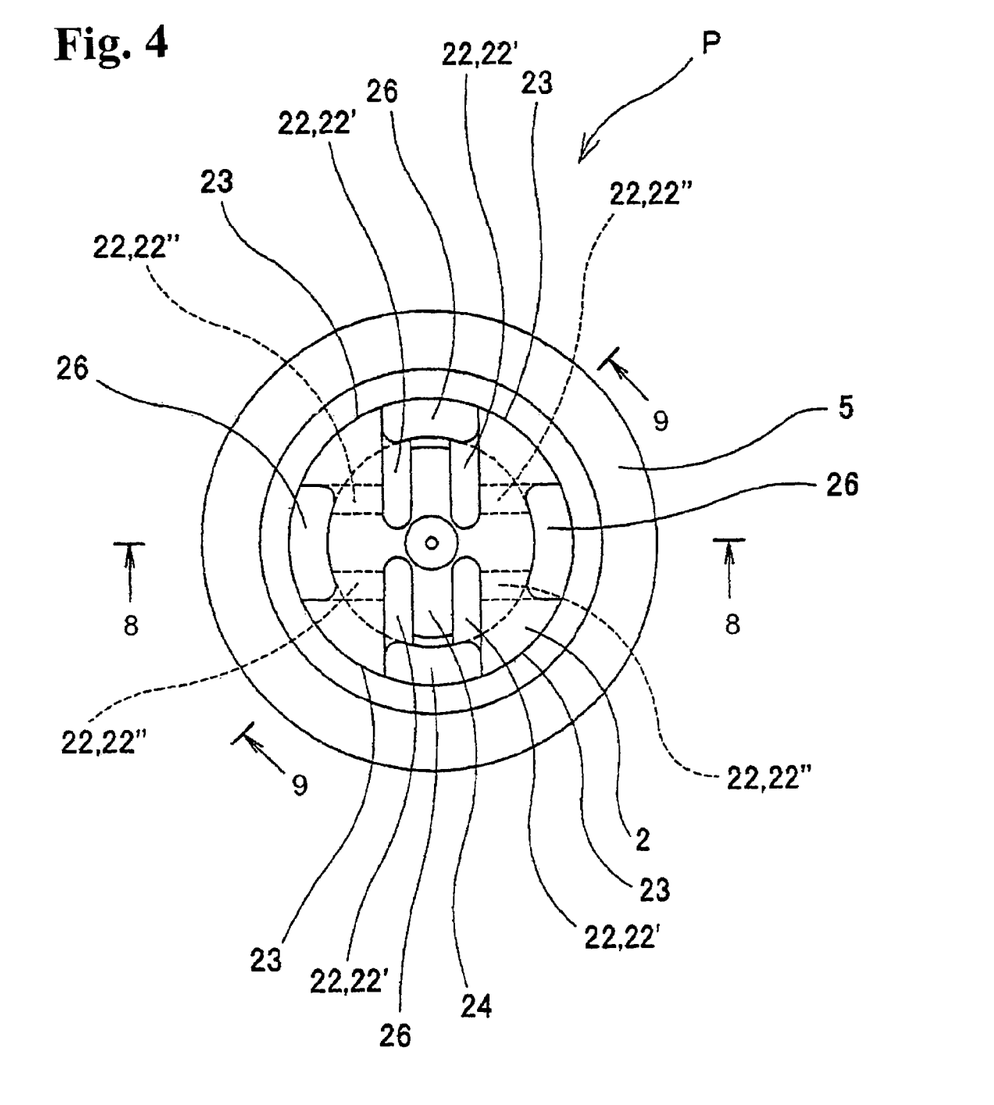
FIG. 4 is a plan view of the same.
Figure 5:
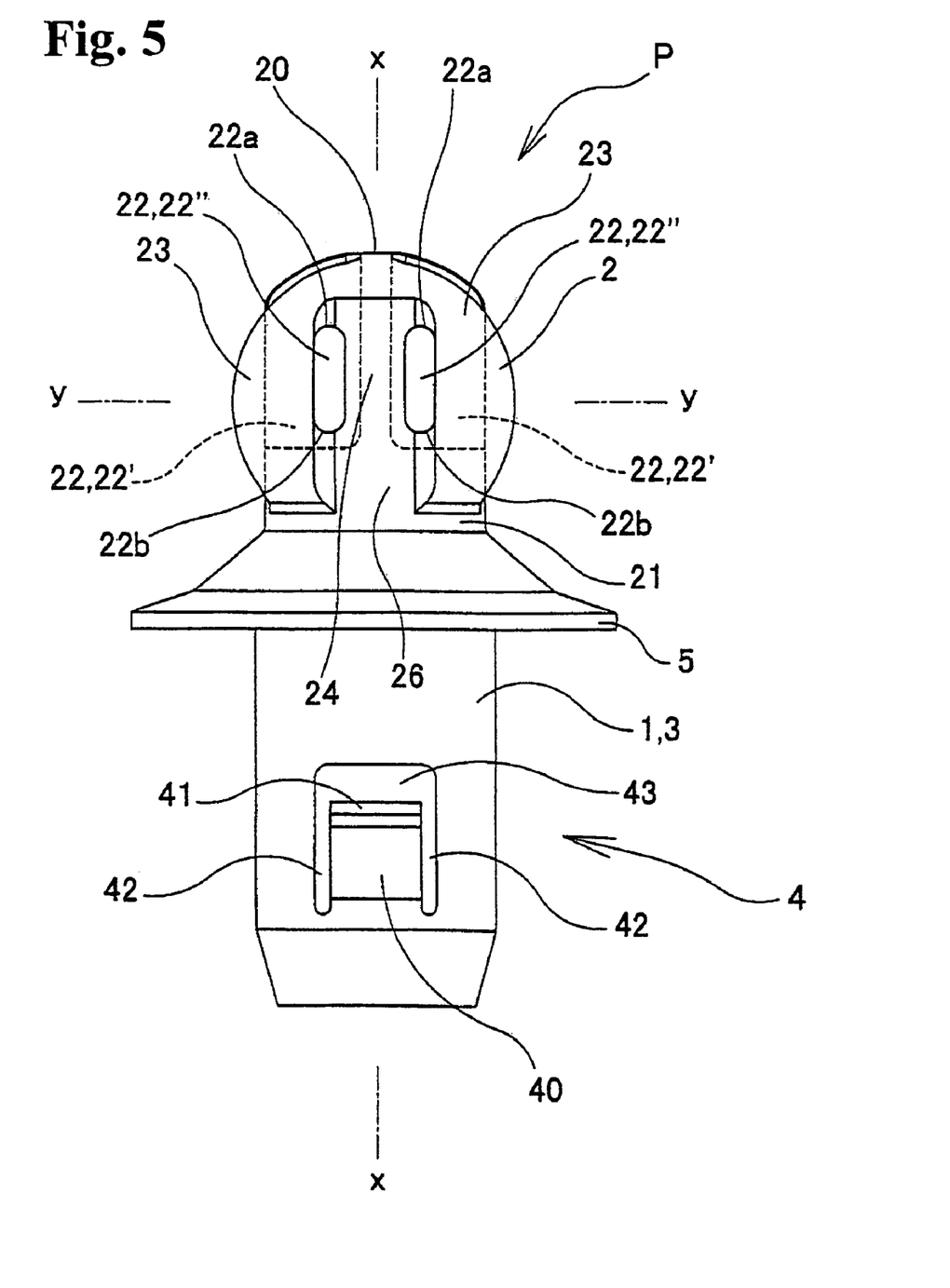
FIG. 5 is a side view of the same.
Figure 6:
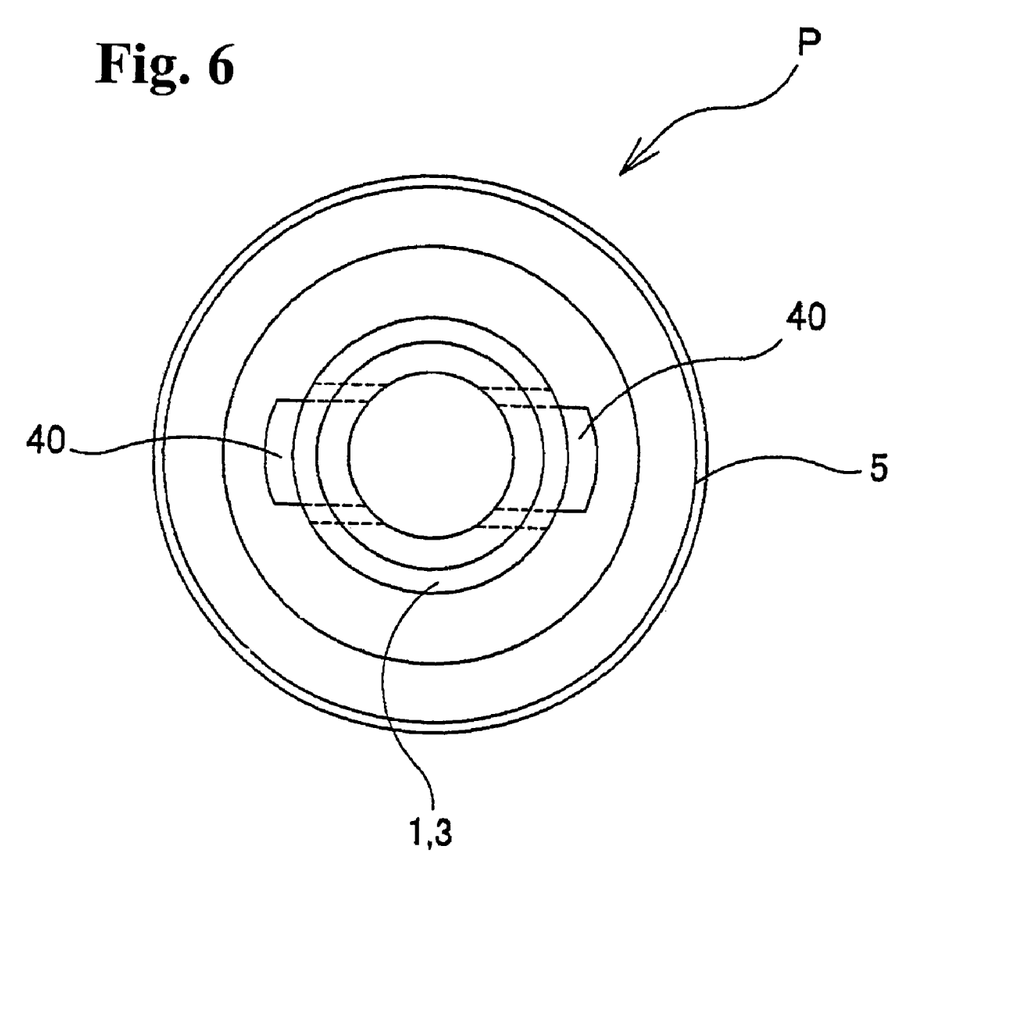
FIG. 6 is a bottom plan view of the same.
Figure 7:
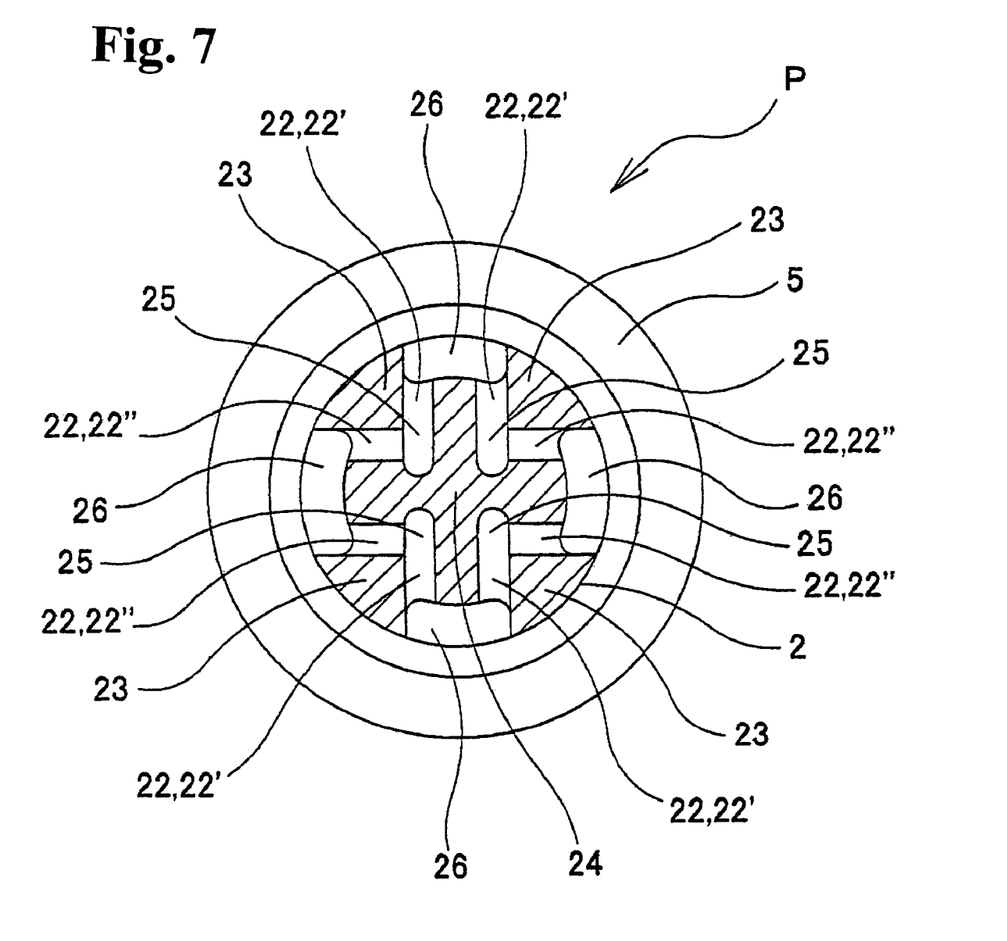
FIG. 7 is a sectional view taken along line 7-7 in FIG. 3.
Figure 8:
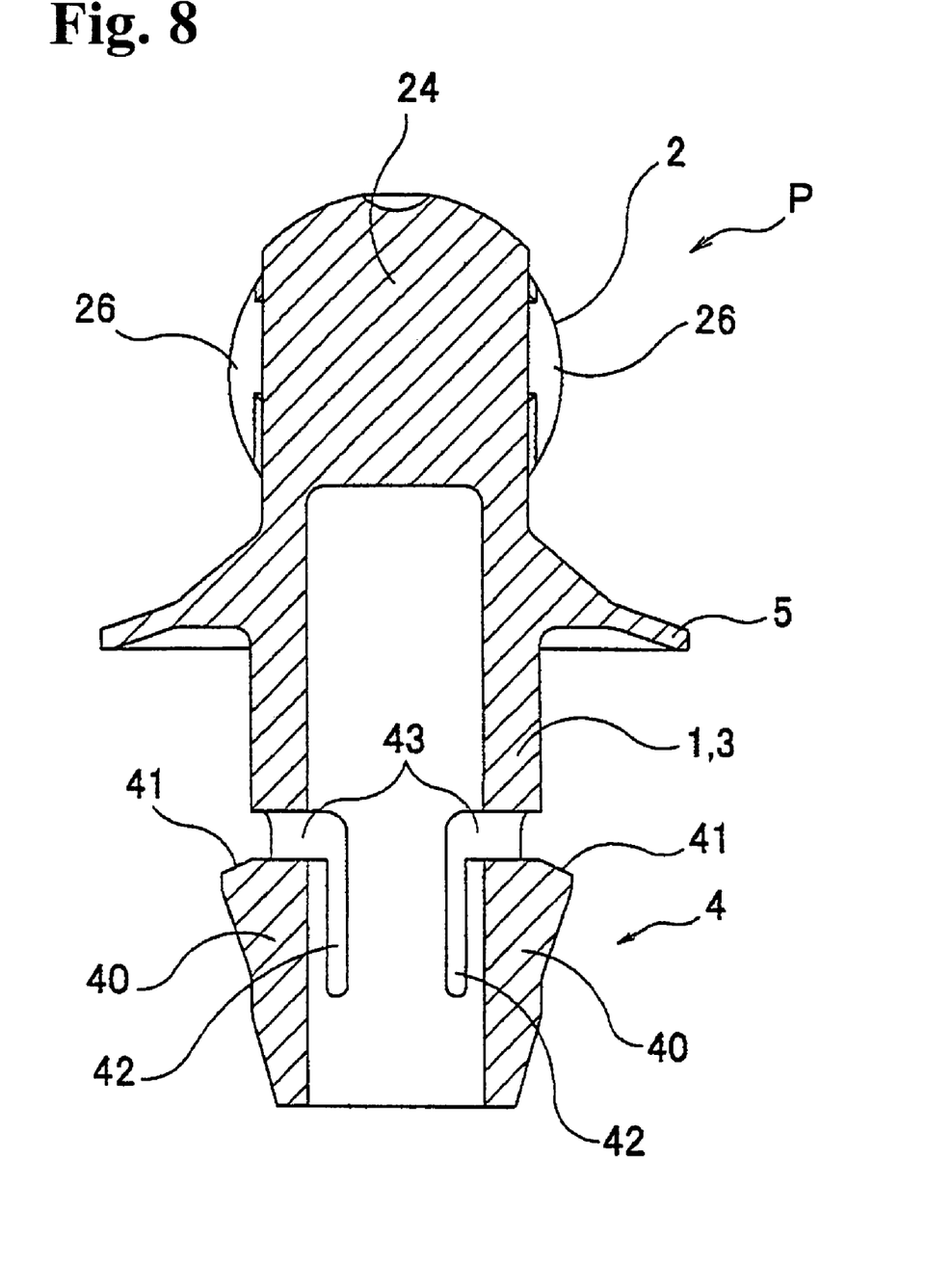
FIG. 8 is a sectional view taken along line 8-8 in FIG. 4.
Figure 9:
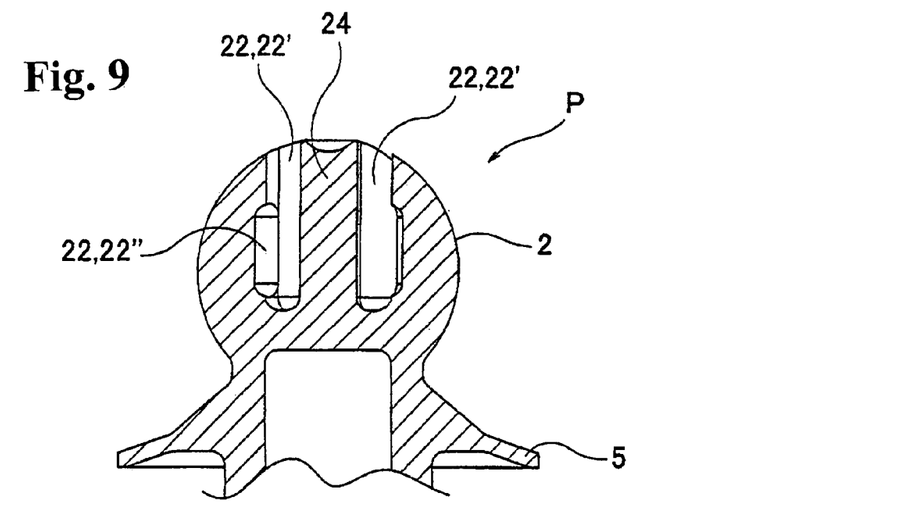
FIG. 9 is a sectional view taken along line 9-9 in FIG. 4.
Figure 10:
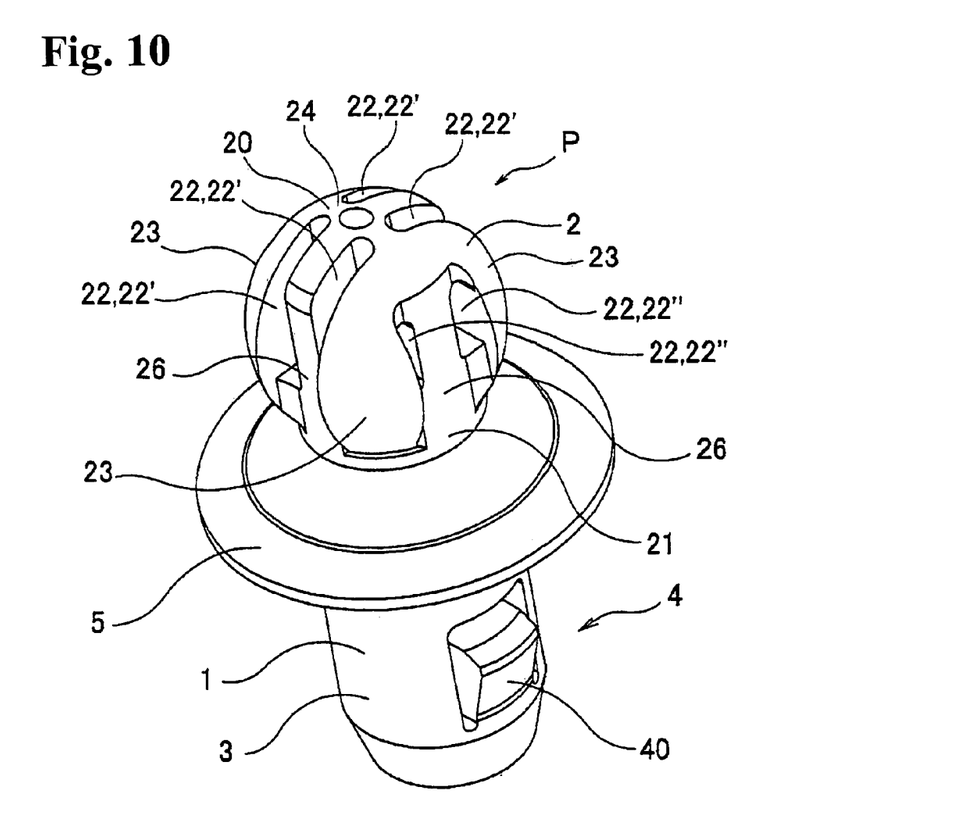
FIG. 10 is a perspective view of the component P.
Figure 14:
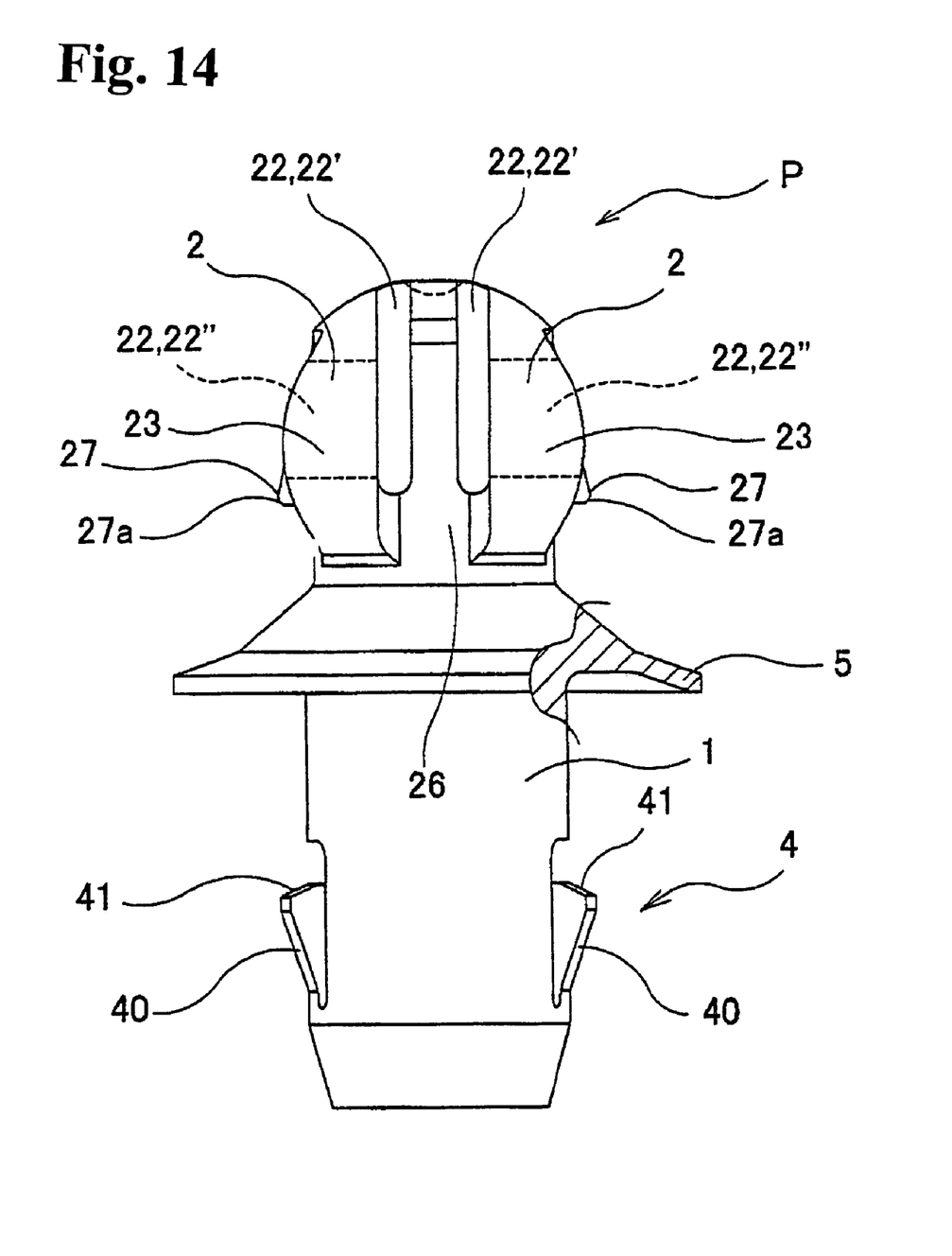
FIG. 14 is a front view of an embodiment of the present invention in which component P shown in FIGS. 1-3 is partially modified.
Figure 15:
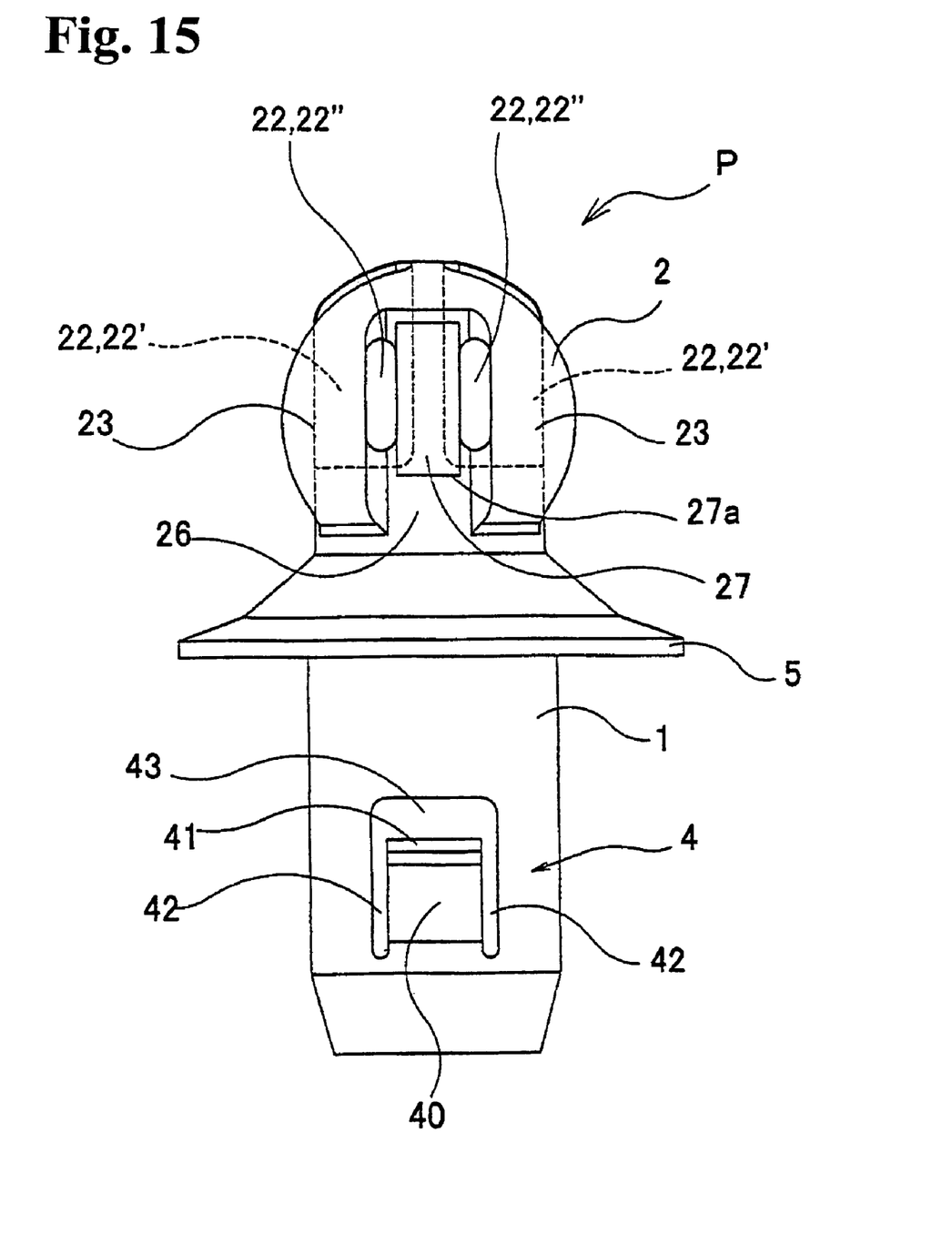
FIG. 15 is a side view of the same.
Figure 16:
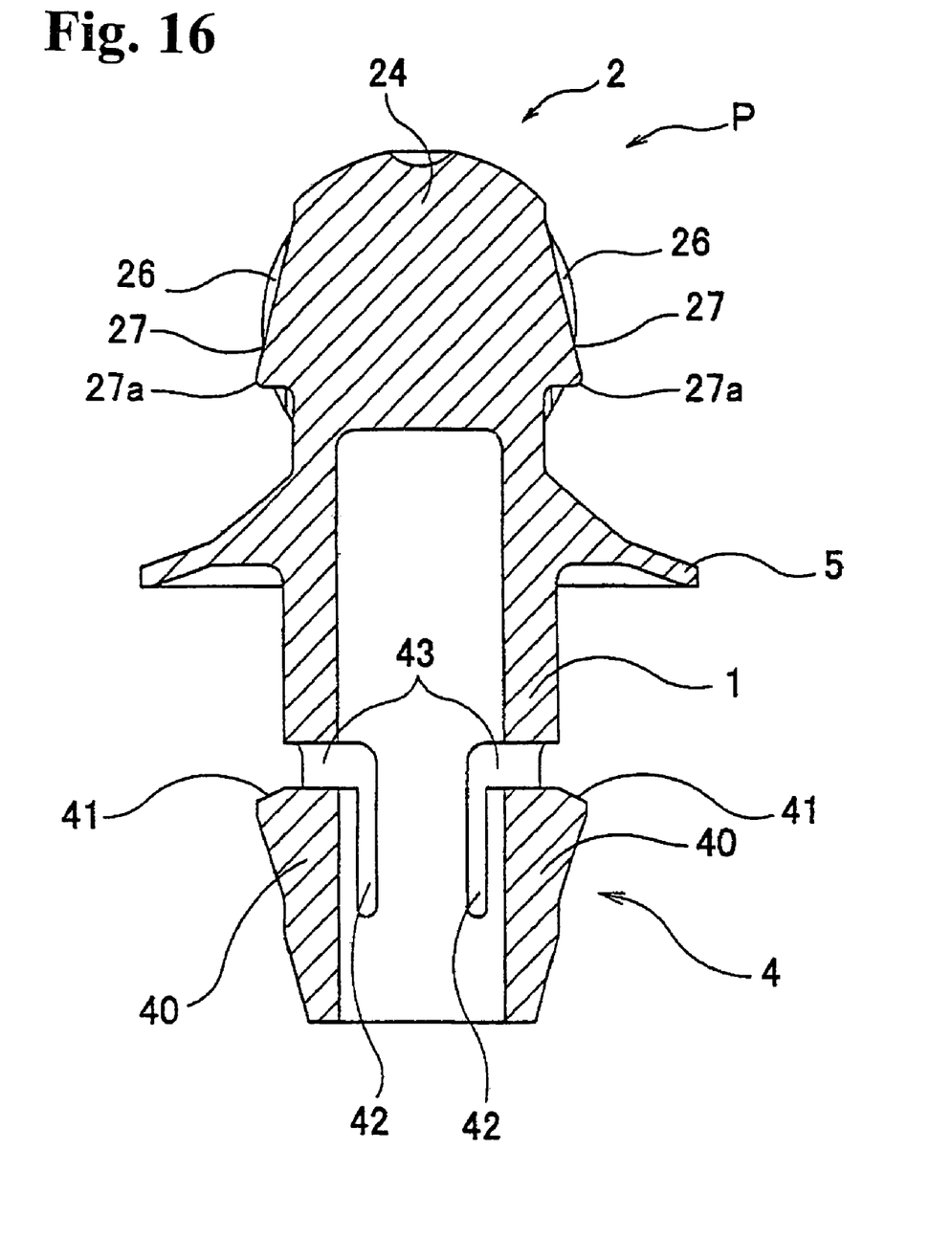
FIG. 16 is a sectional view of the same.

FIG. 1 shows an embodiment in which two members 100 and 200 that are to be coupled via a universal joint component P are separated, and FIG. 2 illustrates a state in which these parts are coupled via this component P. FIGS. 3 to 13 show the component P, and FIGS. 14 to 16 illustrate a component P that is partially different in the construction from the component P depicted in FIGS. 3 to 13.

The universal joint component P in this embodiment is used to couple member 100 installed on the component P with the member 200 furnished with spherical socket 201 so as to move universally when fitted into the spherical socket 201.

When the member 100 to be installed on the component P is a reflector forming an automotive lamp unit, and the member 200 furnished with a spherical socket 201 is a lamp body forming the automotive lamp, an automotive lamp unit furnished with a reflector whose tilt is adjustable via component P is constructed.

More specifically, the automotive lamp unit is constructed by installing the reflector at the installation section 4 of the shaft 1 in the universal joint component P, and fitting the spherical head 2 of the shaft 1 into the spherical socket 201 provided on the lamp body.

Alternatively, when the member 100 to be installed on the component P is a lamp body forming an automotive lamp unit, and the member 200 furnished with the spherical socket 201 is a reflector forming the automotive lamp, an automotive lamp unit furnished with a reflector whose tilt is adjustable via the component P is constructed.

More specifically, the automotive lamp unit is constructed by installing the lamp body at the installation section 4 of the shaft 1 in the universal joint component P, and fitting the spherical head 2 of the shaft 1 into the spherical socket 201 provided on the reflector.

When constructed as above, first of all, the reflector can be installed easily and tilt-adjustably to the lamp body by fitting the spherical head 2 of the shaft 1 in the universal joint component P into the spherical socket 201 disposed on either the reflector or the lamp body side.

Second, the spherical head 2 on the shaft 1 in the universal joint component P, as described later, has split head sections 23 that can flexibly deform by utilizing gaps 22 formed on the side of the spherical head 2, and thus are easily fitted into a spherical socket 201, but difficult to slip out of it. Even when vibration during travel or the like is applied, the reflector is stably held by the lamp body.

The component P has the has shaft 1 made of plastic which is furnished with the spherical head 2 on one end and an installation section 4 on the other end. Moreover, the member 100 installed at the installation section 4 of the shaft 1 is coupled with the member 200 furnished with a spherical socket 201 so as to move universally by fitting the spherical head 2 into the spherical socket 201.

In the embodiment shown in the figures, the component P is provided with the tubular section 3 and the spherical head 2 that is integrally formed at one end of the tubular section 3 forming the shaft 1. In the embodiment shown in the figures, the tubular section 3 is constructed to form a cylindrical shape. The other end, i.e., the side of the tubular section 3 opposite of the end that is joined with the spherical head 2, is free. In the example shown in the figures, moreover, a disc-shaped outer brim 5 is formed around the tubular section 3 between the tubular section 3 and the spherical head 2. Moreover, between the tubular section 3 and the spherical head 2 at both sides of the tubular section 3 across its diameter, flexible catches 40, whose catching surfaces face the outer brim 5, are formed.

In the embodiment shown in the figures, each of the flexible catches 40, 40 is constructed by sectioning a portion of the tubular section 3 with a pair of longitudinal grooves 42, 42 along a shaft axis x of the shaft 1 and a groove 43 formed sideways between the ends of the pair of longitudinal grooves 42, 42 near the outer brim 5. The outer face of each flexible catches 40 is constructed so as to gradually rise as it approaches the outer brim 5, and to thereby form the aforementioned catching surface 41 at the tip of the flexible catch 40, namely, on the side of the outer brim 5.

Moreover, in the embodiment shown in the figures, the tubular section 3 is inserted into the member 100, which is furnished with an installation hole 101 having a diameter to allow the entry of the tubular section 3 from the opposite end of the spherical head and the diameter slightly smaller than the distance between the tips of the aforementioned pair of the flexible catches 40, 40, until it reaches the position where the aforementioned outer brim 5 touches the one surface of member 100. Each of the flexible catches 40, 40 is inwardly bent once, but regains its original form at the position where the tubular section 3 is completely inserted into installation hole 101, thereupon the catching face 41 of the flexible catch 40 is caught by the recessed rim section provided in the back of installation hole 101. By this catching action, the component P is installed on the member 100 which is to be joined with the member 200 having the spherical socket 201 so as to move universally (FIG. 2). In other words, in the embodiment shown in the figures, the installation section 4 of the shaft 1 is comprised of the aforementioned pair of flexible catches 40, 40.

The spherical head 2 is constructed to have a roughly spherical appearance so that one portion of its outer surface forms a face substantially superposed on the spherical surface of a phantom sphere. When inserted into the spherical socket 201, which has a hollow inner section shaped with the phantom sphere and a socket opening 201a having a slightly smaller diameter than the phantom sphere and communicatively connected to the inner section, through the socket opening 201a, the spherical head 2 couples the member 100 installed on the shaft 1 with the member 200 having the spherical socket 201 so as to move universally, while allowing its outer surface to slidably contact with the inner surface of the spherical socket 21.

One or more gaps 22, which are composed of grooves or through holes formed so as to straddle phantom line y that substantially passes through the center of the spherical head 2 and perpendicularly intersects with the shaft axis x, are created on the side of the spherical head 2 located between the top end 20 and the joining base 21 that joins the spherical head 2 with the shaft 1 (namely, the location in the spherical head 2 where the aforementioned tubular section 3 and spherical head 2 are joined). The construction is such that the split head sections 23 sectioned by the gaps 22 flexibly deform when the spherical head 2 is inserted into the spherical socket 201 through the socket opening 201a having a slightly smaller diameter than that of the spherical head 2.

According to the component P in this embodiment, therefore, the spherical head 2 is fitted into the spherical socket 201 through the socket opening 201a with a single motion by flexibly deforming the side sections of the spherical head 2 of the component P, thereby allowing the spherical socket 201 to bear the spherical head 2 so as to move universally. In other words, the split head sections 23 are flexibly deformed once so that the largest section of the spherical head 2, namely, the position of phantom line y that substantially passes through the center of the spherical head 2 and perpendicularly intersects the shaft axis x, can be inserted through the socket opening 201a, but allowed to regain their original forms to prevent the spherical head 2 from slipping out of the socket opening 201a.

In this embodiment, moreover, the distance between the upper ends 22a of the gaps 22 positioned near the top end 20 and the phantom line y is larger than the distance between the lower ends 22b of the gaps 22 positioned near the joining section 21 and the phantom line y.

In this embodiment, therefore, the split head sections 23 formed by the gaps 22 easily flexibly deform near the top end 20 of the spherical head 2, but not near the joining base 21. In other words, when the spherical head 2 is inserted into the spherical socket 201 through the socket opening 201a, the section positioned near the top end 20 flexibly deforms more easily, and thus the spherical head 2 is smoothly inserted into the spherical socket 201. On the other hand, when force is applied to the spherical head 2 that is inserted into and coupled with the spherical socket 201 in the direction of slipping out of the spherical socket 201, such force is resisted because it is difficult for the locations of the split head sections 23 near the joining base 21 of the spherical head 2 to flexibly deform. Accordingly, the coupled state between the spherical socket 201 and the spherical head 2, i.e., the state where the two members 100 and 200 are coupled via the component P, is ensured with stability.

In this embodiment, moreover, the gaps 22 are made of grooves, and the split head sections 23 are formed so as to allow the upper ends 23a and lower ends 23b to join with the core 24 near the upper end 20 and the joining base 21 of the spherical head 2, respectively. The core is formed by the gaps 22, 22 created in the spherical head at two adjacent locations in different directions and communicatively connected with each other inside the spherical head, the gaps forming the gaps for deformation 25 with the core 24 between upper ends 23a and lower ends 23b.

In this embodiment, therefore, the spherical head 2 is provided with a certain level of rigidity while providing the split head sections 23 with a required flexible deformation property.

In the embodiment shown in the figures, recesses 26 are formed in four side locations of the spherical head 2 around the shaft axis x of the shaft 1 at substantially equal intervals. Each recess 26 is elongated along the shaft axis x of the shaft 1, and is opened outwardly at the top end 20 and the joining base 21 of the spherical head 2. The recesses 26 formed in four locations in this way form the aforementioned split head sections 23, each being formed between two adjacent recesses 26, 26. In the example shown in the figures, the outer surfaces of the split head sections 23 formed in this way correspond to the face substantially superposed on the spherical surface of the aforementioned phantom sphere, and the split head sections 23 contact the inner surface of the spherical socket 201 primarily at their outer surfaces.

In the example shown in the figures, among the aforementioned recesses 26, 26 formed in four locations, the recesses 26, 26 in opposing two locations are each provided with two strips of first grooves 22', 22' extending along the aforementioned shaft axis x. The two strips of the first grooves 22', 22' are opened outwardly towards the top end 20 of the spherical head 2. Among the aforementioned recesses 26, 26 formed in four locations, the remaining recesses 26, 26 in opposing two locations are each provided with two second grooves 22", 22" extending along the aforementioned shaft axis x. The second grooves 22", 22" are shorter than the first grooves 22', 22'. The upper groove ends of the second grooves 22", 22" near the top end 20 of the spherical head 2 are positioned more inward than the upper groove ends of the first grooves 22', 22' located on the same side, and the lower groove ends of the second grooves 22", 22" near the joining base 21 of the spherical head 2 are positioned more inward than the lower groove ends of the first grooves 22', 22' located on the same side. In the example shown in the figures, moreover, the direction in which the second grooves 22", 22" are formed substantially intersects with the direction in which the first grooves 22', 22' are formed at right angles, and at the same time, the first grooves 22', 22' and second grooves 22", 22" are communicatively connected with one another inside the spherical head 2.

In other words, in the embodiment shown in the figures, the gaps 22 are formed by the first grooves 22' and second grooves 22", and the gaps 22 formed as above allow the spherical head 2 to form the split head sections 23, 23 in four locations in which their upper ends and lower ends are allowed to respectively join with the aforementioned core 24 and the gaps for deformation 25 are formed to have the core 24 between the upper and lower ends.

In the embodiment shown in the figures, moreover, two adjacent split head sections 23 with the recess 26 having the first grooves 22' interposed therebetween are formed symmetrically, and two adjacent split head sections 23 with the recess 26 having the second grooves 22" interposed therebetween are also formed symmetrically.

Figure 11:
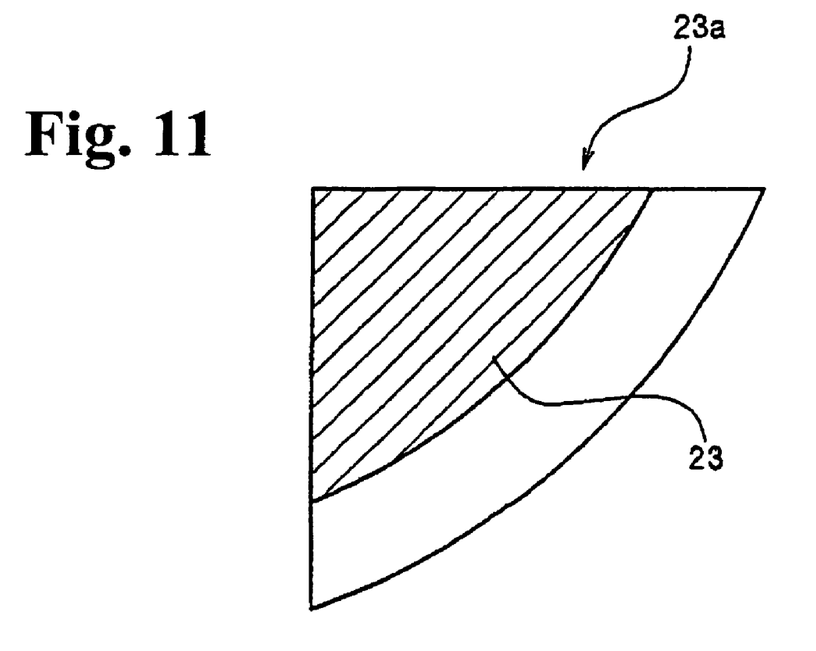
FIG. 11 is a sectional view of one of split head sections 23 taken along line 11-11 in FIG. 3.
Figure 12:
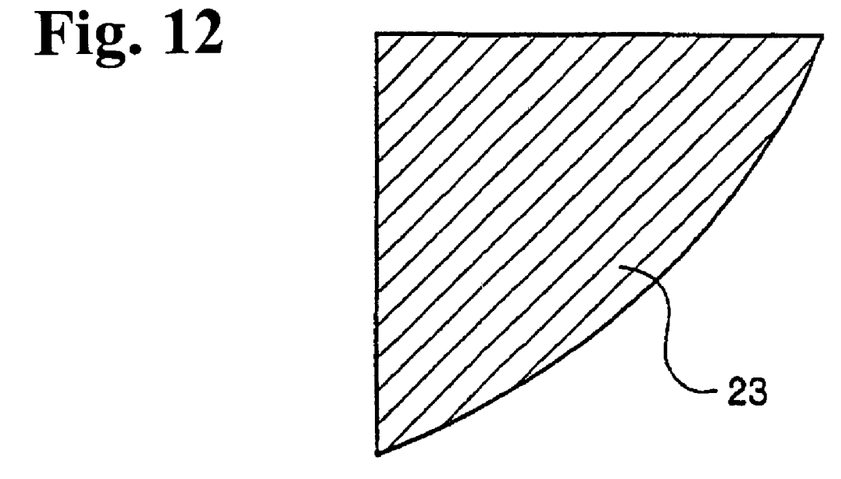
FIG. 12 is a sectional view of one of split head sections 23 taken along line 12-12 in FIG. 3.
Figure 13:
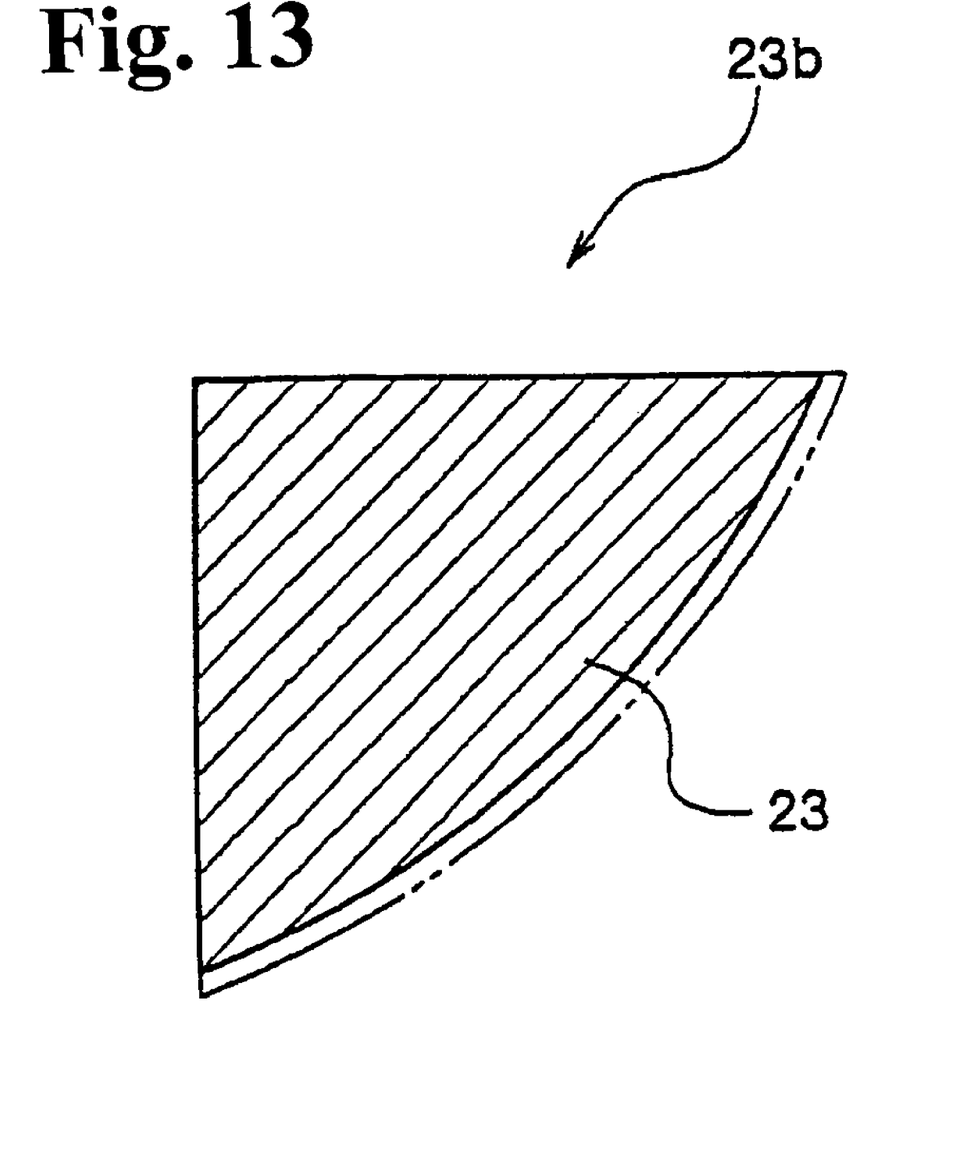
FIG. 13 is a sectional view of one of split head sections 23 taken along line 13-13 in FIG. 3.

In the embodiment shown in the figures, moreover, the sectional areas of the lower ends 23b of the split head sections 23 (FIG. 13) are larger than the sectional areas of the upper ends 23a of the split head sections 23 (FIG. 11).

In other words, for each of the aforementioned first grooves 22' and second grooves 22" forming the gaps 22, the distance between the upper groove end positioned near the top end 20 of the spherical head 2 and the phantom line y is greater than the distance between the lower groove end positioned near the joining base 21 of the spherical head 2, and, as a result, the sectional area at the upper end 23a of the split head section 23 is larger than the sectional area at the lower end 23b of the split head section 23.

In the embodiment shown in the figures, therefore, the split head sections 23 formed by the gaps 22 flexibly deform more easily and effectively near the top end 20 of the spherical head 2, while on the other hand, the flexible deformation is made difficult near the joining base 21.

FIGS. 14 to 16 depict an embodiment having protrusions 27, which flexibly deform when the spherical head 2 is inserted into the spherical socket 201 to enter the spherical socket 201, formed near the joining base 21 of the spherical head 2.

In this embodiment, two recesses 26 having the aforementioned second grooves 22" are each provided with the protrusion 27 therein along the shaft axis x of the shaft 1. The protrusion 27 is of right-angled triangular cross-section; the base is integrally communicatively connected with the core 24 located between the two strips of the second grooves 22"; and the hypotenuse rises from top end 20 towards the joining base 21 of the spherical head 2. The distance between apex 27a of the protrusion 27 disposed within the recess 26 on one side and apex 27a of the protrusion 27 disposed within the recess 26 on the other side is slightly larger than the diameter of the socket opening 201a of the spherical socket 201. When the spherical head 2 is inserted into the spherical socket 201, the protrusions 27 are inserted into the spherical socket 201 while flexibly deforming slightly.

In this embodiment, therefore, when force is applied to the spherical head, which has been inserted into and coupled with the spherical socket 201, in the direction of slipping out of the spherical socket 201, the protrusions 27 abut against the rim 201b of the socket opening 201a from the inside of the spherical socket 201 to resist such force. Accordingly, the coupled state between the spherical socket and the spherical head 2, namely, the state wherein two members 100 and 200 are coupled via the component P, can be ensured with a greater degree of stability.

The disclosure of Japanese Patent Application No. 2004-051552 filed on Feb. 26, 2004 is incorporated herein.

While the invention has been explained with reference to the specific embodiments of the invention, the explanation is illustrative and the invention is limited only by the appended claims.

What is claimed is:

1. A universal joint component for connecting two members, comprising:
    a shaft,
    an installation section formed on one end of the shaft, and
    a spherical head formed on the other end of the shaft, said spherical head including a joint base joined to the shaft, a top end located at a side opposite to the joint base, at least one gap formed on a side of the spherical head between the top end and the joining base, said at least one gap being formed of a groove or through hole so as to straddle a phantom line substantially passing through a center of the spherical head to perpendicularly intersect a shaft axis of the shaft, and split head sections defined by the at least one gap so that the split head sections flexibly deforms when the spherical head is inserted into a spherical socket;
    wherein said at least one gap has a first distance between an upper end of the at least one gap positioned near the top end of the spherical head and the phantom line and a second distance between a lower end of the at least one gap positioned near the joining base of the spherical head and the phantom line, said first distance being greater than that of the second distance; and
    wherein said at least one gap includes grooves extending in different directions and communicating with each other inside the spherical head to thereby form a core defined by the grooves surrounding the core and gaps between upper and lower ends, said split head sections being connected by the core with respect to the joint base and deformable by the gaps.

2. A universal joint component according to claim 1, wherein said spherical head further includes recesses on an outer surface between the split head sections located adjacent to each other.

3. A universal joint component according to claim 2, wherein two grooves are arranged parallel to each other to extend inwardly from each of the recesses.

4. A universal joint component according to claim 1, wherein said split head sections have sectional areas at upper and lower ends, said sectional area at the lower end being greater than that of the upper end.

5. A universal joint component according to claim 1, further comprising flexible protrusions formed at the spherical head near the joint base.

6. An automotive lamp unit comprising a reflector, a lamp body and the universal joint component according to claim 1, said reflector being connected to one of the shaft and the spherical head, and the lamp body being connected to the other of the shaft and the spherical head.

7. A universal joint component for connecting two members, comprising:
    a shaft,
    an installation section formed on one end of the shaft, and
    a spherical head formed on the other end of the shaft, said spherical head including a joint base joined to the shaft, a top end located at a side opposite to the joint base, four recesses formed at a peripheral surface between the joint base and the top end, split head sections, each being defined between two of the recesses adjacent to each other, and a plurality of gaps extending inwardly from the four recesses so that the split head sections flexibly deform when the spherical head is inserted into a spherical socket.

8. A universal joint component according to claim 7, wherein said plurality of gaps includes two pairs of grooves, each pair extending from one of the recesses toward a center of the spherical head between the joint base and the top end, said two pairs being arranged symmetrical to the center.

9. A universal joint component according to claim 8, wherein said plurality of gaps includes a pair of through holes extending between two of the recesses arranged opposite to each other, said through holes communicating with the grooves.

10. A universal joint component according to claim 7, wherein said plurality of gaps includes a pair of through holes extending between two of the recesses arranged opposite to each other.

* * * * *